Figure 1:
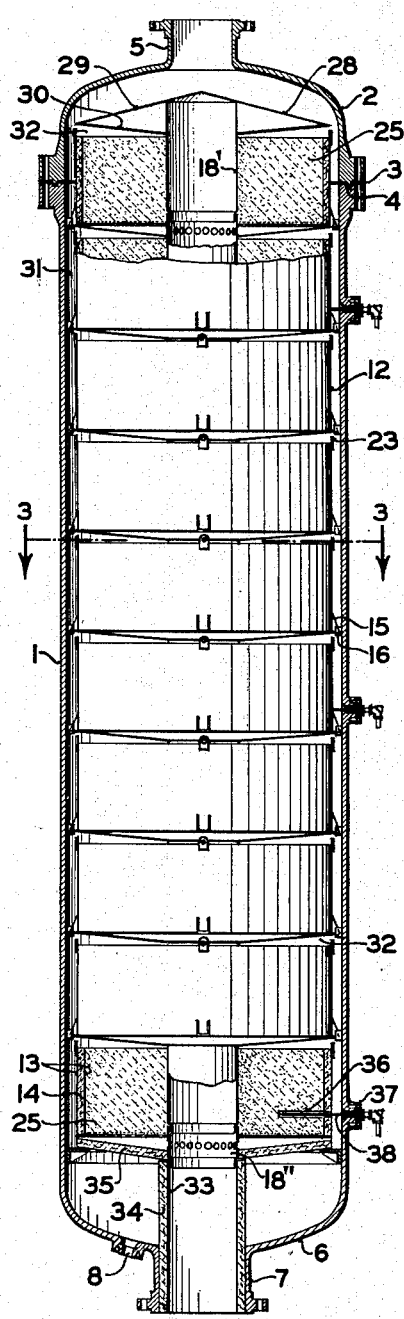

Feb. 13, 1945.  L. A. MEKLER ET AL  2,369,478
REACTOR
Filed April 25, 1941

INVENTORS
LEV A. MEKLER
CLARENCE G. GERHOLD
BY *Lee J Bary*
ATTORNEY

Patented Feb. 13, 1945

2,369,478

UNITED STATES PATENT OFFICE 2,369,478

REACTOR

Lev A. Mekler and Clarence G. Gerhold, Chicago, Ill., assignors to Universal Oil Products Company, Chicago, Ill., a corporation of Delaware Application April 25, 1941, Serial No. 390,224

11 Claims. (Cl. 23—288)

This invention relates to an improved form of reactor in which to conduct conversion reactions in the presence of solid granular catalytic or non-catalytic contact material. It will be found particularly advantageous as applied to catalytically promoted hydrocarbon conversion reactions, such as cracking, dehydrogenation, isomerization and the like, but is broadly applicable to many other types of reactions and particularly those in which relatively low operating pressures and low pressure drop through the catalyst or contact material is advantageous.

The features of the reactor provided permit its use for conducting both endothermic and exothermic reactions under substantially adiabatic conditions. The reactor will be found particularly advantageous for the catalytic cracking of hydrocarbon oils, for example, and similar reactions wherein the catalyst or contact material requires frequent periodic reactivation or regeneration. For example, in catalytic cracking deleterious heavy conversion products of a carbonaceous or hydrocarbonaceous nature, resulting from cracking of the hydrocarbons (which reaction is endothermic) are deposited on the catalyst and must be periodically removed therefrom to restore its activity. Such regeneration of the catalyst is accomplished by burning the deposited combustible materials from the catalyst mass in a stream of hot oxygen-containing gases and this, of course, is an exothermic reaction. Reactors of the type herein provided may be employed for this service by providing a plurality thereof, each of which is alternately utilized as a zone in which to conduct the cracking reaction and as a zone in which to accomplish regeneration of the catalyst. Both reactions may be conducted under substantially adiabatic conditions in the sense that no circulating convective medium is required to supply heat to the endothermic reaction and to abstract heat from the exothermic reaction, as has heretofore been considered necessary in catalytic cracking. By use of the type of reactor herein provided, the total heat required for conducting the cracking reaction may be supplied to the hydrocarbon reactants prior to their introduction into the reactor, with the exception of any heat stored in the metal parts of the reactor and in the catalyst bed during the preceding reactivating step of the process. Except for incidental radiation losses from the reactor, the only heat abstracted during exothermic regeneration of the catalyst is that carried away in the outgoing stream of spent or partially spent reactivating gases.

The reactor which we provide employs a plurality of individual beds of catalyst or contact material disposed in superimposed relationship on trays within the shell of the reactor and the incoming stream of reactants or reactivating gases, as the case may be, is divided into a plurality of separate streams each of which is passed through an individual bed. The separate streams of resulting reaction products are thereafter commingled and the commingled stream discharged from the reactor. The trays are so constructed and arranged that a space is provided above each catalyst bed which spaces directly communicate with an annular space provided between the trays and the shell of the reactor. A separate space is provided beneath each catalyst bed and the first and second named spaces communicate with each other only through the catalyst beds. The space beneath each catalyst bed directly communicates with a continuous central conduit formed by serially connected conduit sections individual to the several trays. Inlet means for reactants and reactivating gases directly communicate with the annular space between the trays and the shell and outlet means provided in the shell directly communicate with the central conduit.

As a special feature of the invention, the trays of the reactor are individually supported from the wall of the vessel, thus eliminating any accumulated load on the lower trays of the assembly and permitting lighter construction of the trays than would otherwise be required. The trays are supported by means of suitable lugs or the like disposed at spaced points around their outer walls and engaged with other lugs or similar supporting means disposed at spaced points about the interior of the shell and secured thereto. In placing the trays within the shell they may be oriented so that the supporting lugs on the shell and on the trays are out of vertical alignment, thus permitting the lower trays to pass by the upper lugs on the shell and are then lowered into the shell to the required elevation and turned to bring the lugs into vertical alignment so that the trays may rest thereon. By positioning the supporting means for the trays in the manner provided, they are disposed in the coolest portion of the reactor during that portion of the operating cycle (the reactivating step) in which the reactor is operated at relatively high temperatures, since they are disposed in the direct path of the stream of incoming reactivating gases, which is much cooler than the outgoing stream of the spent or partially spent reactivat- As another feature of the invention, the construction provided obviates stresses due to any difference in expansion and contraction between the trays and the reactor shell, the individual trays floating from their supports without rigid connection between the trays. In order to accomplish this, the beds of catalyst or contact material on the trays are employed as seals, the downpipe or central conduit from each tray extending well into the catalyst bed of the succeeding lower tray. This feature also eliminates the necessity of accurate machining of any portion of the trays or accurate alignment of the superimposed trays, as is necessary when closely fitted parts are depended upon for sealing the spaces above and beneath the catalyst beds.

In the preferred embodiment of the invention, the bottoms of the trays are of substantially conical shape. This feature has several distinct advantages. It provides an inlet space of gradually decreasing height above each catalyst bed in the direction of travel of the incoming reactants an outlet space of gradually increasing height beneath each catalyst bed in the direction of travel of the outgoing reaction products. This form of inlet space above each catalyst bed is particularly important since the velocity of the gases entering the same is thus reduced, for a space of given total size, and materially decreases the danger of blowing the catalyst particles toward the center of the bed. Since this space is not active (i. e., not occupied by catalyst), it should be kept small for good volumetric efficiency. The decreasing inlet spaces and increasing outlet spaces above and beneath the catalyst beds also make for more uniform distribution of the reactants across the catalyst bed, which is obviously important.

Another important feature of the invention resides in the insulated outer walls of the trays which decreases heat losses to and from the catalyst beds and insures more uniform temperatures throughout the length of the reactor. Due to the insulated walls the incoming reactants passing through the annular space around the trays are not materially cooled by dissipation of heat to the catalyst beds in which the endothermic reaction is taking place and incoming reactivating gases passing through said annular space are not substantially heated by exothermic heat of reaction generated in the catalyst beds. With this provision, average temperatures within the catalyst beds during processing of the reactants and reactivation of the catalyst are kept closer to the minimum and maximum temperatures at any point in the catalyst beds and much better control of the reaction is therefore accomplished.

Another feature of the invention, in its preferred embodiment, reenforcing ribs are provided between the substantially conical bottom of each tray and the perforated plate disposed thereabove upon which the catalyst bed rests, these ribs extending radially from the outer walls of the tray to the central conduit. Thus a truss-like construction is accomplished which strengthens the conical bottom and the perforate plate, permitting lighter construction than could otherwise be employed.

The above mentioned and other features and advantages of the improved form of reactor herein provided will be apparent with reference to the accompanying diagrammatic drawing and the following description thereof.

Figure 1 of the drawing illustrates one specific form of reactor embodying the features of the invention and is a vertical elevation of the reactor shown partially in longitudinal section.

Figure 2:
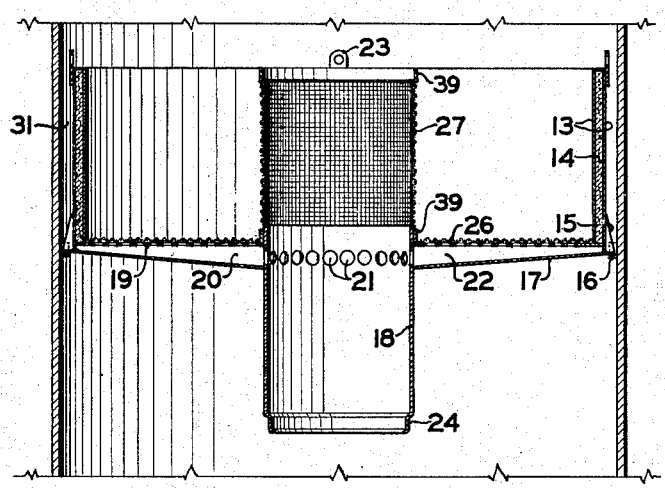

Figure 2 is an enlarged detail of a portion of the reactor shell showing one of the catalyst trays 12 in place therein. The catalyst is omitted from the tray in this figure and the tray and shell are shown in cross-section.

Figure 3:
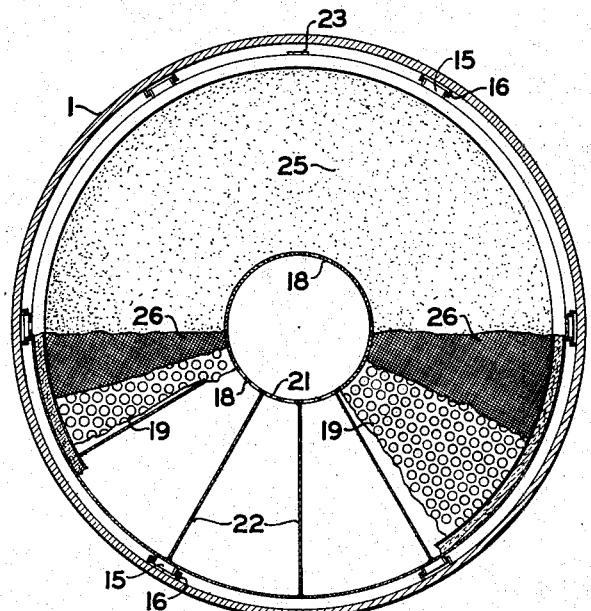

Figure 3 is a sectional view through the shell of the reactor taken along the plane indicated by line 3—3 in Figure 1, showing a plan view of one of the trays with a portion of the screen 26 and perforate plate 19 cut away to reveal the radial stiffening ribs 22.

Figure 4:
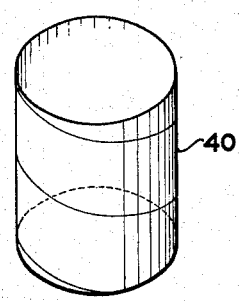

Figure 4 illustrates a combustible catalyst retaining and positioning member which may be employed in place of member 27 in Figure 2.

Referring to the drawing, the specific form of reactor here illustrated comprises a cylindrical outer shell 1 having a removable upper head 2 flanged at 3 to the cylindrical shell and detachably secured thereto by suitable bolts, not illustrated. A gasket 4 or other suitable sealing means is provided at the joint between the flanges. A flanged inlet nozzle 5 is provided on the removable upper head. The lower head 6 of the vessel is integral with the shell, in the case here illustrated, and is provided with a flanged outlet nozzle 7. A drain port 8 is also provided in the lower head 6 with means at the port for securing a conduit thereto.

A plurality of catalyst trays 12, some of which are shown in elevation and some in cross-section in Figure 1, and one of which is illustrated in enlarged cross-sectional detail in Figure 2, are provided within the shell and are arranged in interconnected superimposed relation. Each of the trays comprises concentric cylindrical outer walls 13 with a space provided therebetween which is closed at the top and bottom, in which suitable heat insulating material, such as, for example, mineral wool, slag wool, glass wool, exfoliated vermiculite or the like is disposed.

Suitable supporting lugs 15 are provided at spaced points about the periphery of the outer wall of each tray and corresponding supporting lugs 16 are provided on the cylindrical shell 1 at elevations corresponding to the positions of the several trays. The trays are thus individually supported on the shell and this, in conjunction with other details of construction of the trays, which will be later described, permits independent longitudinal expansion and contraction of the trays and the shell with changes in temperature. The outside diameter of the trays, exclusive of lugs 15, is sufficiently less than the diametrical distance between the lugs 16 on the shell to permit passage of the trays past lugs 16 during assembly and disassembly of the trays within the shell. A tray being lowered into the shell is oriented so that the lugs 15 and 16 do not engage until it reaches the desired elevation and is then turned so that lugs 15 rest upon lugs 16.

The bottom closure member 17 of each of the trays is substantially conical and slopes downward from the outer wall 13, to which it is joined, to a central conduit 18. Member 17 is also joined to conduit 18 which extends above and beneath member 17, as illustrated. A perforate member, such as plate 19 is disposed within the tray a short distance above member 17, leaving a space 20 therebetween of increasing height from its outer to its inner extremities. Openings 21 are provided through the wall of member 18 at an elevation corresponding to that of space 20 so that space 20 in each tray is in direct communication through openings 21 with the area enclosed by the central conduit 18. Perforate plate 19 is also joined to the outer wall 13 and the wall of conduit 18 and radial stiffening ribs 22 are provided in space 20, these ribs being vertically disposed and joined along their top and bottom edges to plate 19 and member 17, respectively, and along their inner and outer vertical edges to conduit 18 and to the outer wall 13, respectively, giving a truss-like construction in the lower portion of the tray and stiffening the same to prevent sagging at its central portion.

Members 23, attached to and extending upwardly from the top of the wall structure 13, are provided at spaced points about the circumference of the tray and have openings therethrough whereby these members may be grasped with hooks or the like on cables to lower the trays into and lift them from the reactor shell.

When assembled within the vessel, the central conduit 18 of each of the trays, with the exception of the lowermost tray in the assembly, extends downwardly into the succeeding lower tray and is provided with a portion 24 of reduced diameter at its lower end which slips within the upper end of conduit 18 on the succeeding lower tray, thus forming a continuous central conduit through the tray assembly which is in direct communication at spaced points along its length with each of the spaces 20. Thus, an annular space is provided between the outer wall structure and the central conduit 18 in each tray above the perforate member 19, and a bed of granular contact material or catalyst, indicated at 25 in Figure 1, is provided within this annular space on each tray. When desired, a suitable wire mesh screen or the like, indicated at 26 in Figure 2, may be provided in each tray to rest upon the perforate member 19 and assist in retaining the granular contact material or catalyst in place, particularly when the particles of the latter are of relatively small size.

In assembling the trays within the reactor, each tray is lowered into position on its supporting lugs and the catalyst or contact material is placed within the tray before the next succeeding higher tray of the assembly is lowered into position. The catalyst or contact material may be placed in the trays before or after they are lowered into the shell and, in either case, to retain it within the annular space provided for its reception, a cylindrical member 27 is slipped over the upper end of conduit 18, which protrudes above perforate plate 19, member 27 extending upwardly from member 18 to the top of the tray or at least to the top of the space within the tray occupied by the catalyst bed. Member 27 may be constructed of wire screen of sufficiently small mesh to retain the catalyst particles and of sufficient resilience that the weight of the catalyst bed will cause it to bear against member 18 of the succeeding higher tray when the latter is inserted into the control opening through member 27 in assembling the trays. It is preferably stiffened at the top and bottom by metal rings 39 or the like attached thereto. Alternatively we may employ, in place of screen 27, a cylinder 40 (see Figure 4) of cardboard, fiber or other combustible material which will burn away during the first period of reactivation in the reactor. In the latter instance it will, of course, be replaced each time the catalyst or contact material is replaced. When this member 40 is burned away, the catalyst will settle into place along member 18 of the succeeding higher tray which has been slipped through member 27 during assembly. The catalyst bed will thereby serve as a seal to prevent communication between the interior of conduit 18 and the spaces occupied by the incoming reactants and reactivating gases, except through the catalyst beds, so that the joints between the conduit sections 18 need not be closely fitted nor packed.

A baffle 28, shown in cross-section in Figure 1, is provided above the uppermost catalyst tray of the assembly and comprises, in the case here illustrated, a substantially cone-shaped top member 29 which slopes downwardly from its central portion to its outer edges and a substantially cone-shaped member 30 which slopes downwardly from its outer edges to its central portion. Members 29 and 30 are joined along their outer edges, which terminate short of the inner surface of the reactor shell, so that the space within the reactor above baffle 28 is in direct communication with the annular space 31 provided between the outer wall of the trays and the inner surface of the reactor shell. A cylindrical member 18', similar to conduit sections 18, is joined at its upper extremity to member 29 of the baffle and at a lower point to member 30. It extends into the uppermost tray of the reactor assembly and its lower end slips within the upper end of member 18 of the uppermost tray in the same manner as the succeeding members 18 are nested one within the other.

Baffle 28 is held a sufficient distance above the top of the uppermost tray that a space 32 of decreasing height from its outer to its inner extremity, is provided between the top of the tray and member 30 of the baffle. Similar spaces 32 are provided between the top of each of the other trays of the assembly and the adjacent member 17 of the succeeding higher tray and each of the spaces 32 is in direct communication with the annular space 31 provided between the outer wall structure of the trays and the inner surface of shell 1.

The central conduit 18", which replaces conduit 18 on the lowermost tray of the assembly may, when desired, be shorter than members 18, but is otherwise substantially the same. Its lower end fits within a sleeve 33 which is joined at its lower end to the flanged nozzle 7 and extends upwardly therefrom for a short distance into the reactor. Preferably, suitable insulating material, such as previously mentioned, is provided about sleeve 33 and along the bottom of the lowermost catalyst tray, the insulation at these points being indicated in the drawing at 34 and 35, respectively.

Preferably each or several of the trays are provided with a thermocouple well comprising a tubular member 36 attached to and extending through the outer wall structure into the space occupied by the catalyst bed, and ports are provided at a plurality of selected points along the length of shell 1 in alignment with the thermocouple wells. Means, such as illustrated for example at 37, are provided at the ports for the reception of a flange through which a thermocouple sheath 38 is inserted and to which it is attached.

The following example of a catalytic cracking operation is given to illustrate the utility of the reactor above described and to show the flow of reactants, reactivating gases and reaction products therethrough.

Hydrocarbon oil heated to a temperature at which substantial cracking thereof will occur upon contact with the catalyst disposed within the trays is supplied to the reactor in essentially vapor state through nozzle 5 and the stream of hydrocarbon vapors is directed by baffle 28 into the annular space 31 about the trays. The vapors flood this space and the spaces 32 above the catalyst beds and pass downwardly through the latter as a plurality of separate streams which pass individually through the individual catalyst beds. The cracking reaction occurs upon contact of the heated hydrocarbon vapors with the catalytic material and the resulting conversion products pass from the catalyst beds through perforate members 19 into the spaces 20 of the trays from which they flow into the central conduit where the individual streams are joined and from which the resulting commingled stream passes through sleeve 33 and outlet nozzle 7 to succeeding separating and recovery equipment, which is not a part of the present invention and is therefore not illustrated.

After a period of continued operation, in the manner above described, the catalyst beds will become fouled with deposits of carbonaceous or heavy hydrocarbonaceous materials formed by the cracking reaction, and reactivation of the catalyst will be required to restore its activity. To accomplish this, after the stream of heated hydrocarbon vapors has been diverted from the reactor to another similar reactor wherein the cracking reaction is continued and after the reactor wherein the catalyst is about to be reactivated has been substantially purged of fluid hydrocarbons, a stream of hot reactivating gases, such as, for example, combustion gases containing a regulated quantity of air are supplied to the reactor through inlet nozzle 5. The reactivating gases are directed by baffle 28 into the annular space 31, flooding this space and the spaces 32 above the catalyst beds from which they flow as a plurality of separate streams downwardly into the individual catalyst beds and burn the combustible deposits therefrom. The resulting spent or partially spent reactivating gases and combustion products pass from the individual catalyst beds through the perforate members 19 into spaces 20 from which they flow through openings 21 into the central conduit. The streams from the several catalyst beds commingle in the central conduit and are directed therefrom through sleeve 33 and outlet nozzle 7 to subsequent equipment not pertinent to the present invention and therefore not illustrated.

The cracking operation is conducted without adding heat to the hydrocarbon vapors following their introduction into the reactor and reactivation is accomplished without abstracting heat from the spent reactivating gases and combustion products in the reactor.

Succeeding the reactivating period, the reactor is substantially purged of oxygen-containing gases and is then ready to serve as a zone in which the cracking reaction may be continued. Thus, two or more reactors of the type provided may be connected by means of suitable conduits and stream-diverting valves, not illustrated, to operate alternately as processing and reactivating zones so that the cracking reaction may be continuously conducted with periodic reactivation of the catalytic material in each reactor.

We claim as our invention:

1. A tray for retaining a bed of granular contact material comprising a substantially cylindrical outer wall, a closure member at the bottom of the tray connecting said outer wall with a depending central conduit and closing the space therebetween, said central conduit extending upwardly into the space of the tray above said closure member, perforate means adapted to retain a bed of granular contact material thereon extending between said outer wall and said upwardly extending portion of the central conduit, said perforate means being disposed above and spaced from said closure member, and said central conduit extending slightly above said perforate means and having openings provided through its wall at the elevation of the space between the perforate means and the closure member.

2. The tray defined in claim 1, wherein the space between the perforate means and the closure member is of increasing height from adjacent said outer wall to adjacent said central conduit.

3. The tray defined in claim 1, wherein the space between the perforate means and the closure member is of increasing height from adjacent said outer wall to adjacent said central conduit and wherein upstanding radial stiffening ribs secured to the perforate means and the closure member are provided within said space.

4. A tray for retaining a bed of granular contact material comprising a substantially cylindrical outer wall, a closure member connecting the bottom of said outer wall with a depending central conduit substantially near the upper end of said depending central conduit, perforate means adapted to retain a bed of granular contact material thereon extending between said outer wall and the said central conduit, said perforate means being disposed above and spaced from said bottom closure member, the central conduit having openings provided through its wall at the elevation of the space between the perforate means and the closure member, lugs attached to the said outer wall at spaced points around its bottom periphery for individually supporting said tray, and said depending central conduit being of slightly smaller diameter at its lower end so that when two of said trays are fitted together the bottom of said depending central conduit of one tray loosely engages with the upper end of the central conduit just above the perforate means of the second said tray.

5. A tray for retaining a bed of granular contact material comprising a substantially cylindrical outer wall, a closure member connecting the bottom of said outer wall with a depending central conduit substantially near the upper end of said depending central conduit, perforate means adapted to retain a bed of granular contact material thereon extending between said outer wall and the said central conduit, said perforate means being disposed above and spaced from said bottom closure member, the central conduit having openings provided through its wall at the elevation of the space between the perforate means and the closure member, and said depending central conduit being of slightly smaller diameter at its lower end so that when two of said trays are fitted together the bottom of said depending central conduit of one tray loosely engages with the upper end of the central conduit just above the perforate means of the second said tray.

6. A reactor comprising, in combination, a substantially cylindrical outer shell closed at its opposite ends and provided on at least one end with a removable closure member which spans substantially the full cross-sectional area of the shell, a plurality of trays of slightly smaller diameter than said shell, each of said trays comprising a substantially cylindrical outer wall, a closure member connecting the bottom of said outer wall with a depending central conduit substantially near the upper end of said depending central conduit, perforate means adapted to retain a bed of granular contact material thereon extending between said outer wall and the said central conduit, said perforate means being disposed above and spaced from said bottom closure member, the central conduit having openings provided through its wall at the elevation of the space between the perforate means and the closure member, said central conduits being constructed and arranged so that, when two of the trays are fitted together, the bottom of one of said conduits loosely engages with the upper end of the central conduit slightly above the perforate means of the second said tray, means for individually supporting the trays on the shell in superimposed spaced apart relationship so that said loosely engaging conduits form a continuous passageway centrally through the shell and with an annular space formed between the outer walls of the trays and the shell, means for introducing fluid to said annular space, and means for removing fluid from said passageway and the shell.

7. The tray defined in claim 1, having supporting lugs therefor provided at spaced points about the periphery of its outer wall.

8. The tray defined in claim 1, having a tubular member, forming a well for the reception of a temperature sensitive device, attached to and extending through the outer wall into the space above said perforate means wherein said contact material is retained.

9. A tray as defined in claim 1 further characterized in the provision of a tubular sleeve adapted to slip over the upper end of the central conduit and extend therefrom to adjacent the top of the tray, thereby forming an annular space for the reception of said contact material between said sleeve and said outer wall.

10. In a reactor comprising an outer shell, the combination of a plurality of trays disposed within said shell in superimposed relationship, perforate catalyst retaining means in each of said trays, and a central conduit depending downwardly from each tray and extending slightly above the perforate means in the tray, said central conduits being constructed and arranged so that the bottom of a central conduit of an upper tray loosely engages with the end of the central conduit extending slightly above the perforate means of the next lower tray.

11. A reactor comprising an outer shell, a plurality of trays disposed within and spaced from said shell in vertically spaced relation to each other, perforate catalyst retaining means in each of said trays, and a central conduit depending downwardly from each tray and extending slightly above the perforate means in the tray, said central conduits being constructed and arranged so that the bottom of a central conduit of an upper tray loosely engages with the end of the central conduit extending slightly above the perforate means of the next lower tray, said central conduits thereby forming a continuous vertical passageway within the shell, openings in each of said conduits at an elevation to establish communication between said passageway and each of the trays below the perforate means therein, means for admitting fluid to the shell and the space between the latter and the trays, and means for removing fluid from said passageway and the shell.

LEV A. MEKLER.
CLARENCE G. GERHOLD.